Patented July 10, 1945

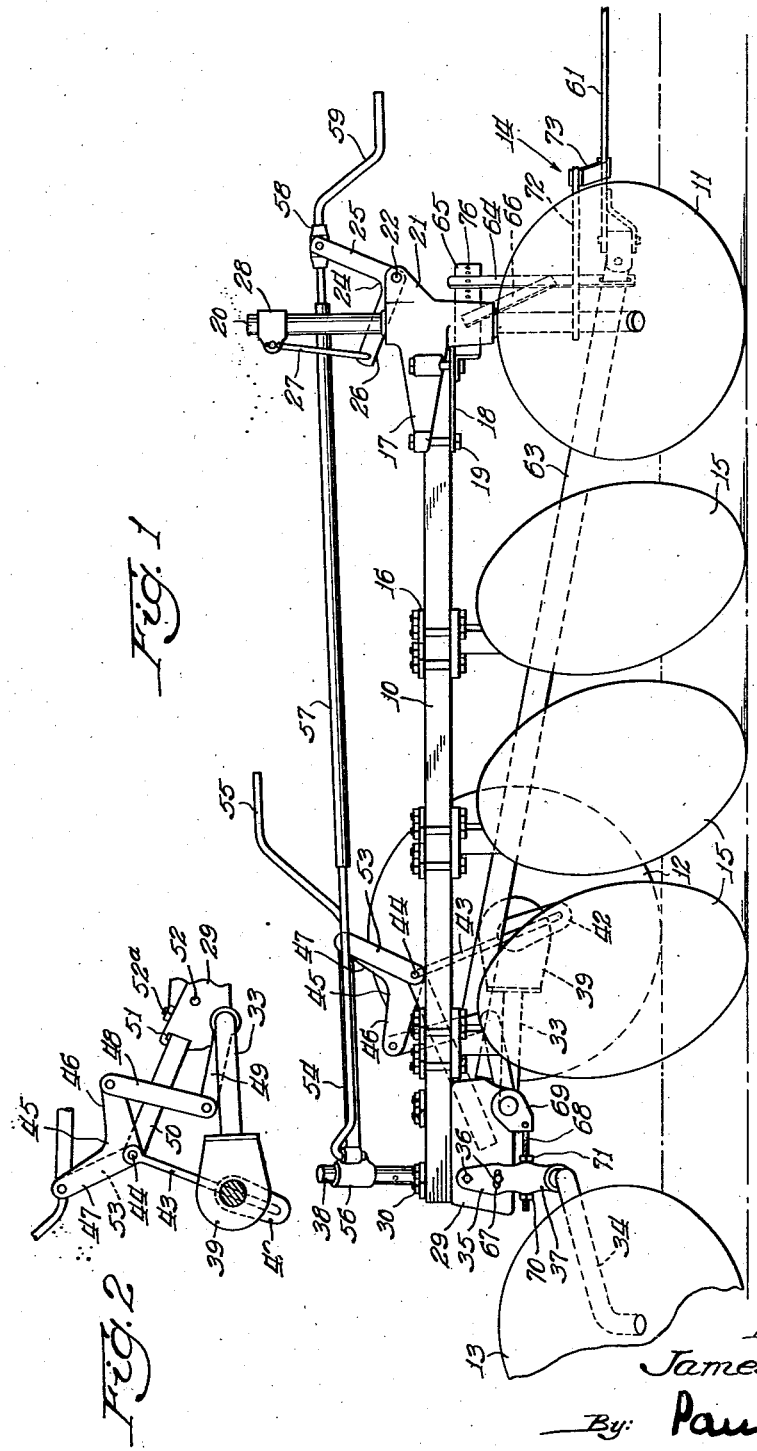

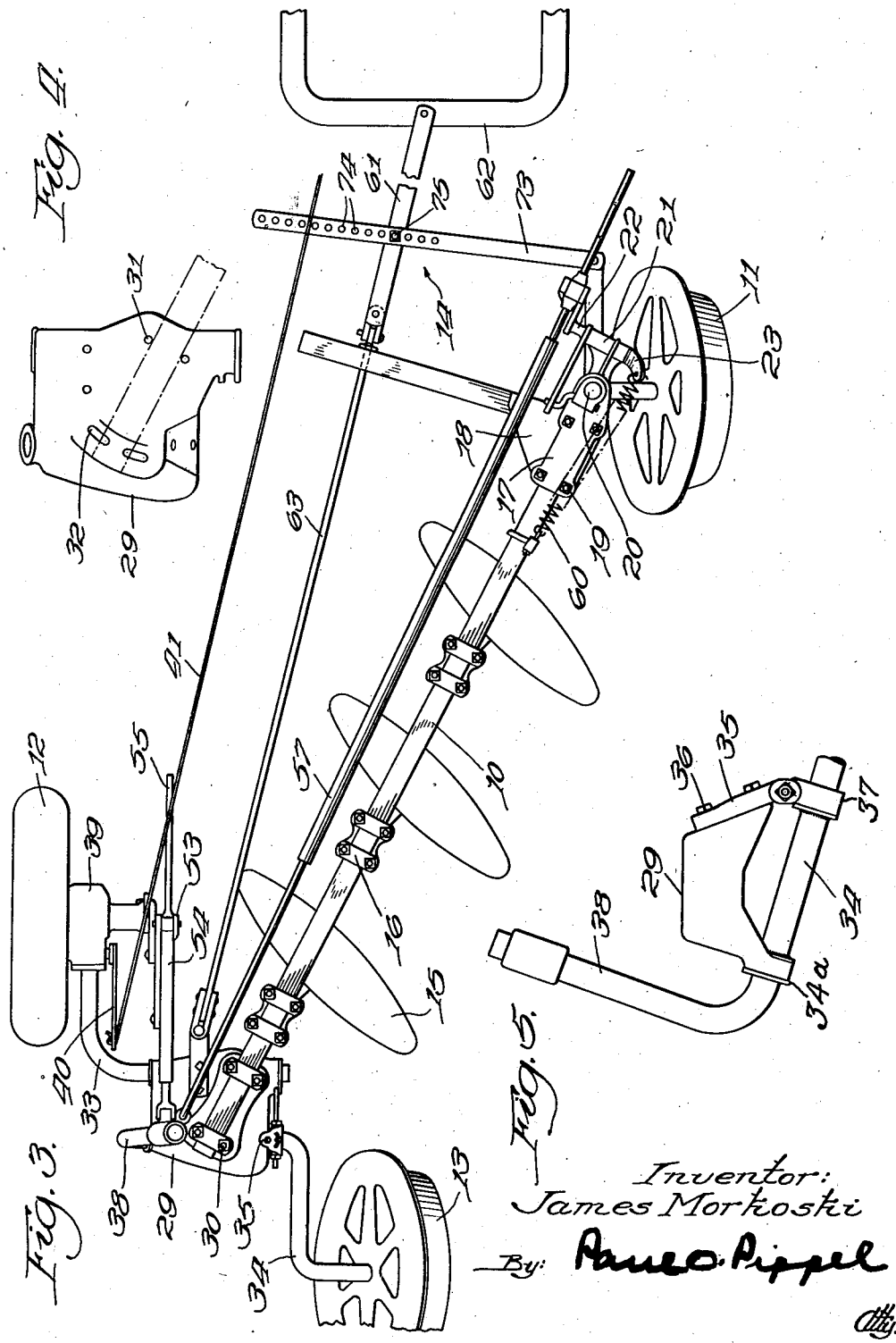

2,380,323

UNITED STATES PATENT OFFICE 2,380,323

PLOW

James Morkoski, Canton, Ill., assignor to International Harvester Company, a corporation of New Jersey Application November 22, 1943, Serial No. 511,258

5 Claims. (Cl. 97—103)

This invention relates to plows and particularly to plows of the type wherein a plurality of disks are rotatable about a common axis extending diagonally across the path of travel of the plow.

An object of the invention is to provide improved means for moving the plow to and from working position.

Another object is to provide means for changing the angle of the plow beam to vary the width of cut of the plow.

Still another object is to provide means for adjusting the angle of the rear furrow wheel to offset side thrust on the plow under certain conditions.

A further object is to provide in an elongated disk gang plow having supporting wheels at opposite ends thereof, single means for manually raising or lowering both ends of said plow simultaneously to adjust the operating depth thereof.

A still further object is to provide means for raising the entire plow by power derived from one of the supporting wheels.

Another object is to provide improved and simplified means for transmitting power for lifting and lowering the plow from the land wheel to the rear furrow wheel.

These and other objects will become clear from the following detailed description when read in conjunction with the accompanying drawings, wherein:

Figure 1 is a view in side elevation of the plow of the present invention;

Figure 2 is an elevational detail, looking from the opposite side of the plow of Figure 1, and showing the mechanism by which the plow is lifted from the land wheel;

Figure 3 is a plan view of the plow shown in Figure 1 and also showing its attachment to the draw-bar of a tractor or the like;

Figure 4 is a plan view of the rear frame casting; and

Figure 5 is a rear elevation of the rear frame casting showing the rear furrow wheel axle rotatably mounted therein.

Referring to the drawings, it will be noted that the plow comprises generally a main frame bar, or beam, 10 set at an angle to the line of draft on the plow, a front furrow wheel 11, a land wheel 12, a rear furrow wheel 13, a draft frame 14, and a number of plow disks 15 attached to the frame bar by clamps 16. To the front end of the beam, a casting 17 is attached by means of a plate 18 and bolts 19. Casting 17 has a vertically extending sleeve portion adapted to slidably receive the upstanding spindle portion of an axle 20, the lower end of which is bent outwardly and journals furrow wheel 11. Projecting forwardly from casting 17 is a member 21 having a bearing portion adapted to receive a sleeve 22. Upon the outer end of shaft 22 is a lever 23, and upon the inner end thereof is a bell-crank 24 having an upwardly extending arm 25 and a rearwardly extending arm 26. The arm 26 is apertured to receive the bent end of a link 27, the other end of which is connected to a collar 28 attached to the upper end of axle 20. The bell-crank 24 is rocked by a mechanism hereinafter described to effect sliding movement of casting 17 upon axle 20 and thus raise or lower the front end of the tool-carrying beam 10 with respect to the ground wheel 11.

To the rear end of beam 10 a frame member in the form of a casting 29 is attached at longitudinally spaced points by bolts 30, and, as shown in Figure 4, openings 31 are provided for the forward set of bolts, and slots 32 for the rear set, for a purpose hereinafter set forth.

The rear end of the plow is supported by the land and furrow wheels 12 and 13, respectively. Land wheel 12 is journaled on a crank axle 33 mounted for rotation in bearings in casting 29. Another crank axle 34, likewise rotatably mounted in casting 29 on a generally horizontal downwardly inclined axis, journals the furrow wheel 13 on the opposite side thereof from the land wheel 12, while on the left side of the castinge 29, axle 34 is mounted in a bearing 34a in the wall thereof. The right side of the casting is provided with a bracket 35, attached to the casting by bolts 36 and having a depending bearing portion 37, in which axle 34 is journaled. The end of axle 34, projecting from the side of the casting adjacent the land wheel 12, is bent upwardly to form a lever or rock arm 38 by which the axle may be rotated to swing the wheel 13 and assist in raising or lowering the tool-carrying beam. Power for raising and lowering the entire plow with respect to its supporting wheels is supplied by the land wheel 12, operating in conjunction with a conventional clutch mechanism 39 of the half-revolution type, actuated by a lever 40, having attached thereto a rope 41 extending forwardly to a point accessible to the operator of the vehicle by which the plow is drawn.

Actuation of the clutch to lower the plow to working position causes rotation of a crank arm 42 through a half-revolution to the position shown in Figure 1. Arm 42 is connected by a link 43 to the pivot 44 of a bell-crank 45 having arms 46 and 47. Arm 46 extends rearwardly and is connected by a link 48 to an arm 49 affixed, as by welding, to the transverse portion of axle 33, and a strap 50, against which the bell-crank reacts, passes through a slot 51 in the casting, wider than the strap, and is fastened to the casting by a bolt 52. The other end of strap 50 is pivoted on the bell-crank at 44. A set screw 52ª, bearing against the upper edge of strap 50, may be utilized to level the plow when needed. The arm 47 of the bell-crank has bolted thereto a spaced plate 53 to provide for pivoting therebetween an extensible member 54 provided with a handle 55 and attached at its other end to a collar 56 on the upper end of the rock arm 38. Likewise connected to the collar 56 is another extensible member 57, extending forwardly and passing through a trunnion 58 in the bifurcated end of arm 25 of bell-crank 24, and having a handle 59. Upon actuation of the clutch 39 by tripping lever 40 to raise the plow to transport position, the crank arm 42 rotates through a half-revolution, axle 33 swings downwardly in a clockwire direction as viewed in Figure 1, carrying with it arm 49 and link 48, and rocking bell-crank 45 in a counter-clockwise direction to exert pressure rearwardly upon lever 38, causing furrow wheel 13 to move downwardly in a counter-clockwise direction with respect to the plow frame. Thus, the mounting of axles 33 and 34 in casting 29 is in the manner of a hinge, so that as clutch 39 operates to cause rotation of axles 33 and 34 in opposite directions, wheels 12 and 13 approach each other to lift the plow. At the same time, member 57 is advanced and bell-crank 24 rocked in a counter-clockwise direction to force wheel 11 downwardly and raise the plow frame. A spring 60 connected to the beam 10 and lever 23 urges crank 24 to counter-clockwise movement and assists in raising the plow to transport position.

The plow of the present invention is adapted to be drawn behind a tractor, or the like, and is provided with a hitch-bar 61 attached, as indicated in Figure 3, to the draw-bar 62 of a tractor, not shown. Hitch-bar 61 is in turn pivotally connected to a draft-bar 63, which extends rearwardly, and is pivotally connected to the rear frame casting 29. The forward portion of draft-bar 63 passes through a slot in a strap 64 attached to an angle-bar 65, which is affixed to the tool beam 10 and extends laterally therefrom. Rigidity is imparted to the strap 64 by a brace 66.

The width of cut of the plow is varied by changing the angle assumed by beam 10 with respect to the line of draft on the plow. This is accomplished by fastening the rear bolts 30 in the slots 32 and swinging the beam laterally in the slots about a center represented by the forward connection of the beam to the casting 29. In order to compensate for the change in side thrust involved in changing the width of cut of the plow, axle 34 may be angularly adjusted to provide for more or less "toe-in" of the furrow wheel 13 against the wall of the furrow made by the plow disks.

It may be noted in Figure 5 that the transverse portion of axle 34 is inclined downwardly and is journaled in spaced bearings, one of which is integral with one wall of the casting 29 and the other of which is a part of bracket 35, which is fastened to the other wall of the casting.

In Figure 1, it will be noted particularly well that the lower bolt 36, which fastens bracket 35 to the casting, is slidable in a slot 67, while the axle 34 is loosely mounted in the bearing portion 34a of the casting 29, thus permitting movement of the bracket 35 and angular adjustment of axle 34 with respect to the plow about a center represented by the bearing 34a. This angular adjustment is effected by a bolt 68 affixed at one end to a lug 69 on the casting. This bolt extends rearwardly and passes through an opening in the bracket 35. Adjustment is made and the axle held in its adjusted position by nuts 70 and 71.

In order to adjust the front wheel 11 to compensate for a change in the angle of beam 10, an arm 72 is weldingly secured to the lower portion of axle 20, and there is pivoted upon the projecting end thereof a member 73 provided with a plurality of openings 74 for the reception of a bolt 75 for attachment to the hitch-bar 61. As member 73 is adjusted laterally, strap 64 may likewise be adjusted laterally, a number of openings 76 being provided in angle-bar 65 for that purpose. The extensible members 54 and 57, manipulated by their respective handles 55 and 59, many be utilized to manually adjust the supporting wheels for varying the operating depth of the plow, the member 57 adjusting front wheel 11, and member 54 adjusting wheels 12 and 13.

In plows of this type it is customary to change the angle of the disks to compensate for the change in angle of the plow beam. However, the mechanism by which this is done forms no part of the present invention.

Having now described the invention, it should be understood that variations may be made therein without departing from the spirit thereof or the scope of the appended claims.

What is claimed is:

1. In a plow comprising a longitudinally-extending tool-carrying beam and a stationary rear frame, a crank axle rotatably mounted at laterally spaced points in said frame, a wheel journaled on said axle on a generally horizontal axis, and means for angularly adjusting said wheel with respect to said frame about a center coincident with one of the locations at which said axle is mounted in said frame.

2. In a plow comprising a longitudinally-extending tool-carrying beam and a stationary rear frame, an axle rotatably mounted at spaced points in said frame and having a projecting end bent to form a crank arm, a ground wheel journaled on said crank arm, and means for angularly adjusting said axle with respect to said frame about a center coincident with one of the locations at which said axle is mounted in said frame.

3. In a disk plow, a longitudinal tool-carrying beam extending longitudinally of the line of draft upon said plow, a ground supporting wheel on the front end of said beam, a frame on the rear end of said beam, a crank axle rotatably mounted at spaced points in said frame, a wheel journaled on said axle on a generally horizontal axis and adapted for swinging movement in a vertical plane to raise or lower the beam with respect to the wheel, means for angularly adjusting said beam with respect to said frame to vary the width of cut of the tools, and means for angularly adjusting said axle with respect to said frame to compensate for the change in the width of cut of the tools.

4. In a disk plow, a longitudinal tool-carrying beam extending diagonally of the line of draft upon the plow, a frame on the rear end of said beam, a furrow wheel at the front end of said beam, a land wheel, a furrow wheel at the rear end of said beam, a crank axle journaling said rear furrow wheel, said axle having a transverse portion journaled in said frame on a laterally and downwardly extending axis and an upwardly bent portion serving as a lever for rocking said crank axle, and means for angularly adjusting said axle with respect to said frame.

5. In a disk plow, a longitudinal tool-carrying beam extending diagonally of the line of draft upon the plow, a frame on the rear end of said beam, a furrow wheel at the front end of said beam, a land wheel, and a furrow wheel at the rear end of said beam supporting said plow, a crank axle journaling said rear furrow wheel, said axle having a transverse portion journaled in said frame on a laterally and downwardly extending axis and an upwardly bent portion serving as a lever for rocking said crank axle, a bearing in one side of said frame adapted to receive the transverse portion of said axle, a bracket adjustably attached to the other side of said frame and having a bearing portion adapted to receive the transverse portion of said axle, and means for adjusting the position of said bracket with respect to said frame.

JAMES MORKOSKI.